(12) United States Patent
Multer et al.

(10) Patent No.: US 7,634,896 B2
(45) Date of Patent: Dec. 22, 2009

(54) LINER CONNECTING DEVICE AND LINER FILLING DEVICE

(75) Inventors: Steven Multer, Pfaffenhofen (DE); Karsten Weber, Pfaffenhofen (DE)

(73) Assignee: Hecht Anlagenbau GmbH, Pfaffenhofen/Ilm (DE)

( * ) Notice: Subject to any disclaimer, the term of this patent is extended or adjusted under 35 U.S.C. 154(b) by 0 days.

(21) Appl. No.: 11/949,926

(22) Filed: Dec. 4, 2007

(65) Prior Publication Data

US 2008/0145198 A1 Jun. 19, 2008

(30) Foreign Application Priority Data

Dec. 7, 2006 (DE) .................. 10 2006 057 760

(51) Int. Cl.
*B65B 1/04* (2006.01)
*B65B 3/04* (2006.01)

(52) U.S. Cl. ............... 53/469; 53/474; 53/175; 53/393

(58) Field of Classification Search .......... 53/469, 53/433, 474, 155, 167, 170, 171, 172, 173, 53/174, 175, 393
See application file for complete search history.

(56) References Cited

U.S. PATENT DOCUMENTS

| | | | | |
|---|---|---|---|---|
| 2,755,971 A * | 7/1956 | Lisciani | .................. | 222/189.01 |
| 2,853,105 A * | 9/1958 | Brown | .................. | 141/285 |
| 2,987,216 A * | 6/1961 | Fletcher | .................. | 220/295 |
| 4,182,386 A * | 1/1980 | Alack | .................. | 141/83 |
| 4,344,468 A * | 8/1982 | Sandberg | .................. | 141/69 |
| 4,487,331 A * | 12/1984 | Hawker | .................. | 220/495.06 |
| 4,569,377 A * | 2/1986 | Ellis | .................. | 141/98 |
| 4,825,913 A * | 5/1989 | Stott | .................. | 141/59 |
| 4,913,309 A * | 4/1990 | Fink | .................. | 220/23.83 |
| 4,991,633 A * | 2/1991 | Wong | .................. | 141/5 |
| 5,124,126 A * | 6/1992 | Ripp | .................. | 422/26 |
| 5,144,992 A * | 9/1992 | Jaerger et al. | .................. | 141/346 |
| 5,154,308 A * | 10/1992 | Larson | .................. | 220/495.06 |
| 5,322,095 A * | 6/1994 | Bolz | .................. | 141/83 |
| 5,516,052 A * | 5/1996 | Adams et al. | .................. | 241/189.1 |
| 5,678,498 A * | 10/1997 | Whaley | .................. | 110/345 |
| 5,715,646 A * | 2/1998 | Smekens | .................. | 53/121 |

(Continued)

FOREIGN PATENT DOCUMENTS

DE 198 06 932 A1 9/1999

(Continued)

OTHER PUBLICATIONS

European Search Report of European Application No. EP 07 11 5851.

*Primary Examiner*—Paul R Durand
(74) *Attorney, Agent, or Firm*—David S. Safran; Roberts Mlotkowski Safran & Cole, P.C.

(57) ABSTRACT

A liner emptying device and a liner filling device as well as methods using them for contamination-free filling and emptying of a liner. This contamination-free filling and emptying prevents any danger to the health of the people working with the packaged substances. Both the liner emptying device and the liner filling device are connected to the liner via a fastening device and the residual films sealing off the device can be removed via an access port, whereby the liner can be filled or emptied without contaminating the surroundings.

16 Claims, 14 Drawing Sheets

U.S. PATENT DOCUMENTS

| | | | |
|---|---|---|---|
| 5,791,123 A * | 8/1998 | Bolz | 53/434 |
| 5,794,407 A * | 8/1998 | Smekens | 53/428 |
| 6,123,654 A * | 9/2000 | LaFleur | 493/217 |
| 6,145,323 A * | 11/2000 | Popp et al. | 62/64 |
| 7,168,460 B2 * | 1/2007 | Dietrich et al. | 141/10 |
| 2008/0197059 A1 * | 8/2008 | Mallett et al. | 209/702 |
| 2008/0247679 A1 * | 10/2008 | Dayton et al. | 383/33 |

FOREIGN PATENT DOCUMENTS

| | | |
|---|---|---|
| DE | 10 2004 005 961 A1 | 7/2005 |
| WO | WO 9524227 A1 * | 9/1995 |
| WO | 00/47473 A1 | 8/2000 |
| WO | 2005/056443 A1 | 6/2005 |

* cited by examiner

LINER CONNECTING DEVICE AND LINER FILLING DEVICE

BACKGROUND OF THE INVENTION

1. Field of the Invention

The invention relates to a liner emptying device and a liner filling device, a method for contamination-free emptying of a liner using the liner emptying device and a method for contamination-free filling of liners using the liner filling device.

2. Description of Related Art

In many branches of industry, e.g., the pharmaceutical or chemical industry, raw materials are used for further processing which, in case of direct contact, would present a considerable danger to health for the people working with these substances. In addition, the raw materials which are usually present in powder or granular form, can contaminate the environment to a high degree. For these reasons, the powder or granular raw materials are surrounded by so-called liners in their transport containers, which can be container or drums. A liner is an inner bag or separate jacket provided in the container for the product to be transported. A liner can also be a film hose which is fastened to the container to be emptied, which has any shape. Both the production method and the re-processing are mostly carried out in a closed system whereby contamination of the environment and health hazards for the workers are avoided. Problematical points are the interfaces for filling the containers containing the liners at the supplier and emptying the containers having the liners for introduction into the further treatment process at the client.

SUMMARY OF THE INVENTION

It is a primary object of the present invention to provide a liner filling device and a liner emptying device and corresponding methods using the devices whereby contamination-free filling and emptying of the liner is possible without presenting health hazards.

This object is achieved by the features of the invention described in detail below in conjunction with the accompanying drawings.

DETAILED DESCRIPTION OF THE INVENTION

Figure 1:
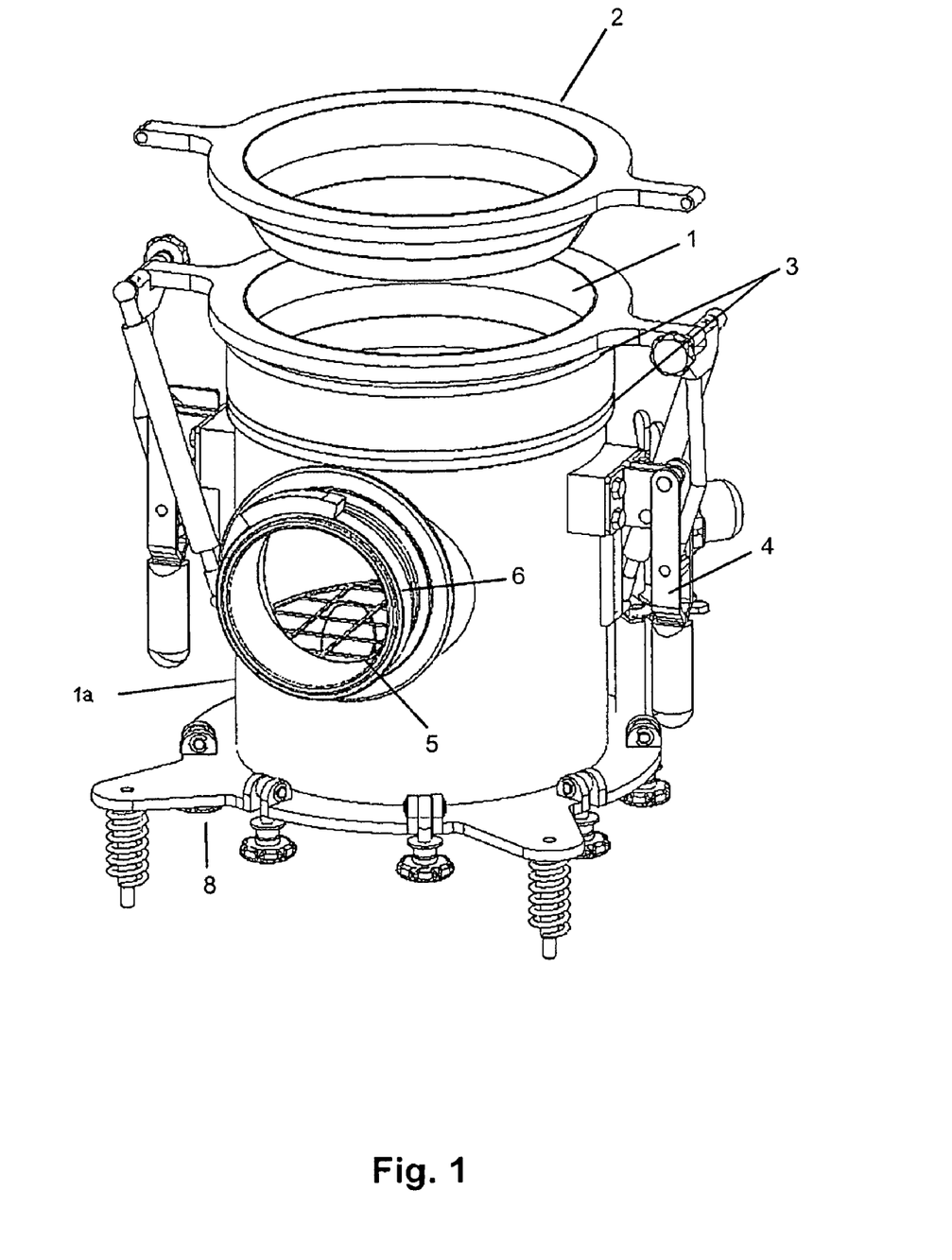
FIG. 1 is a perspective view of a liner emptying device according to the preferred embodiment of the invention.

FIG. 1 shows a device for emptying containers containing liners or containers to which a liner is attached which comprises a preferably cylindrical base body 1a forming a chamber, an opening 1 in the base body 1a, a sealing flange 2 for sealing the liner at the opening 1, two grooves 3 in which the liner can be fastened, preferably with an O-ring, at least one hand lever 4 for opening and closing the sealing flange 2 and an access port 5 which provides access to a chamber in the base body 1a, two grooves 6 being provided at the access port 5 for fastening a film bag or film package, preferably with an O-ring.

Figure 2:
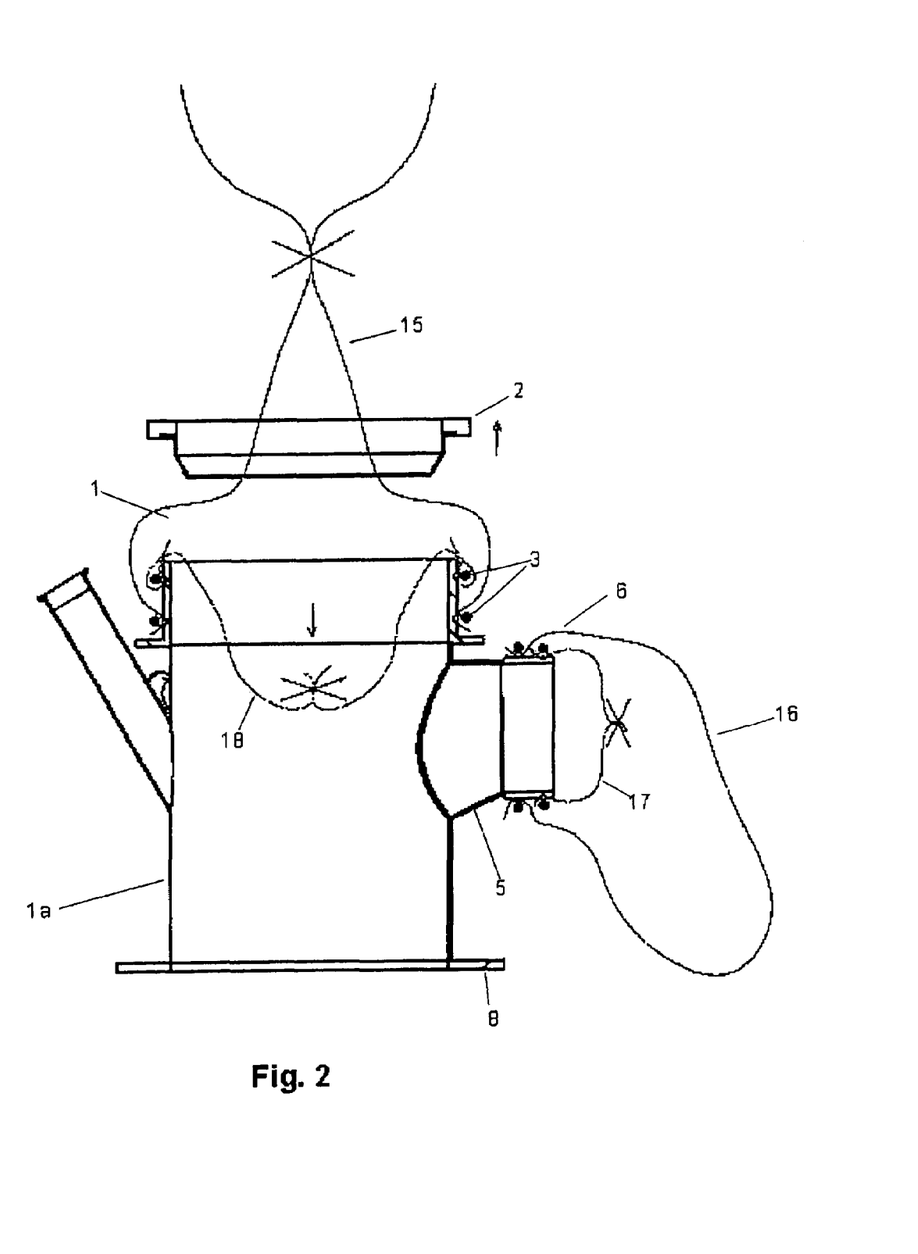
FIG. 2 shows a first step of a method using the liner emptying device of FIG. 1.
Figure 3:
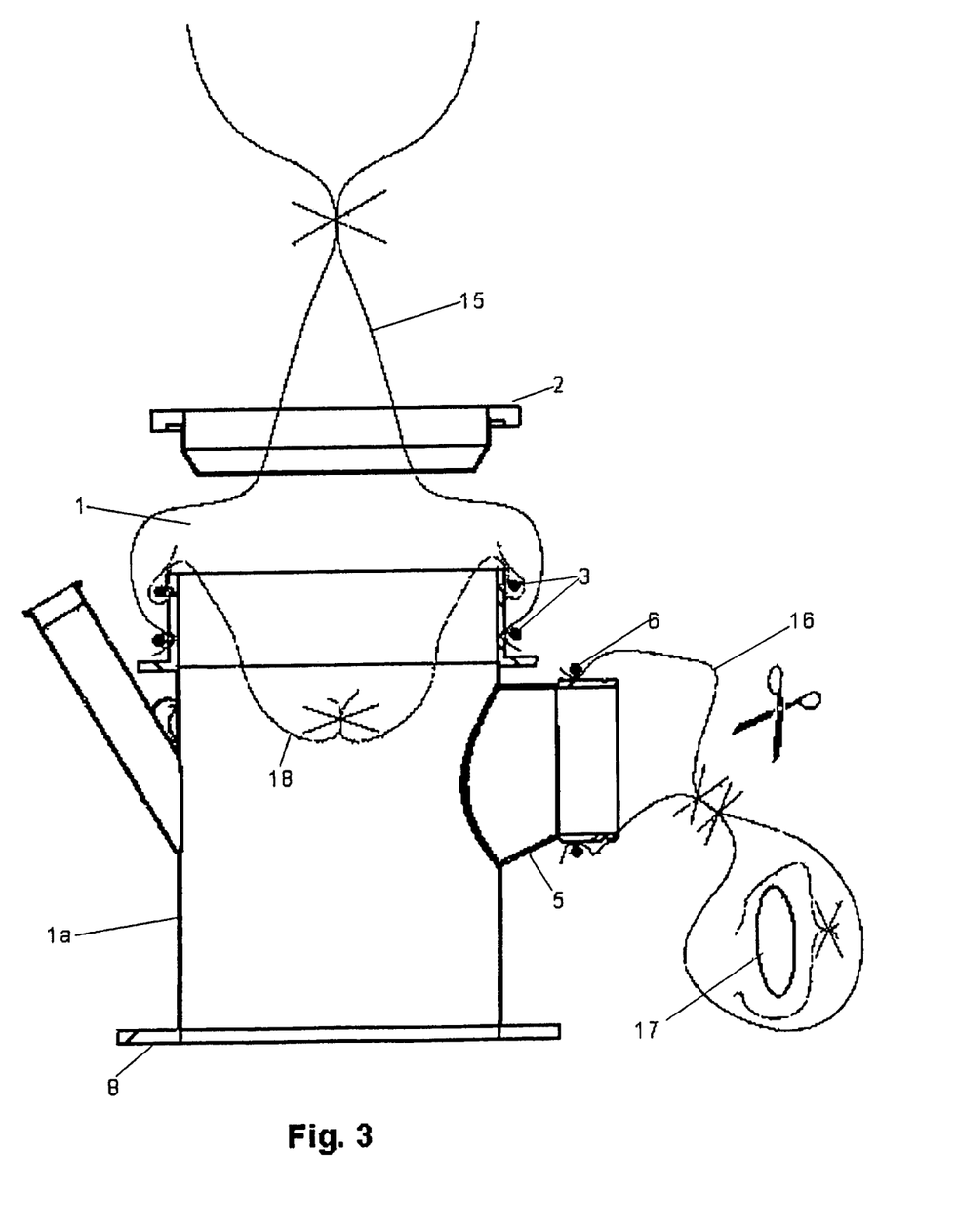
FIG. 3 shows a second step of the method using the liner emptying device of FIG. 1.
Figure 4:
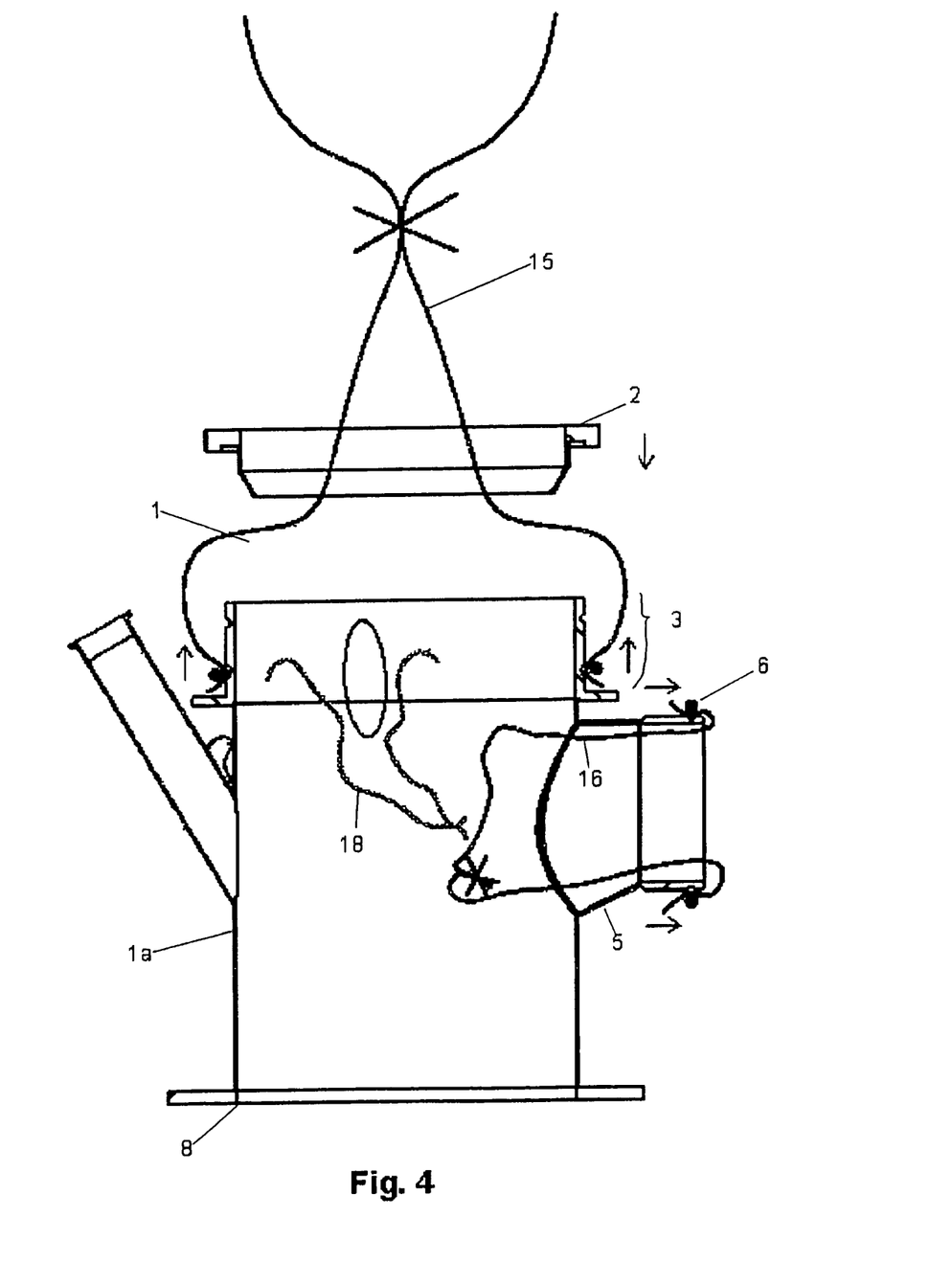
FIG. 4 shows a third step of a method using the liner emptying device of FIG. 1.

As shown in FIG. 2, the closed liner 15 is passed through the sealing flange 2 and fastened on the lower of the two grooves 3 using an O ring. At this time, the liner emptying device is also closed with a film 18 which is fastened to the outer of the two grooves 3 using an O-ring and which originates from the previously emptied liner. The lateral access port 5 is likewise closed with a tied-off film 17 which is fastened to the outer of the two grooves 6 and originates from the previously used film bag. Fastened to the inner of the two grooves 6 is another film bag 16 which further closes the lateral access port 5 and into which the tied-off film 17 can be drawn, as shown in FIG. 3. After the tied-off film 17 has been removed from the lateral access port inside the film bag 16, the film bag 16 is tied off twice at a suitable point, preferably by cable ties and separated by cutting between them, whereby the tied-off film 17 is removed from the liner emptying device. The liner emptying device is now accessible through the lateral access port 5 as shown in FIG. 4, via the remaining portion of film bag 16. The user can reach into the liner emptying device via this access and grip the tied-off film 18 which is fastened to the upper of the two grooves 3 and which closes the liner emptying device so as to remove it.

Figure 5:
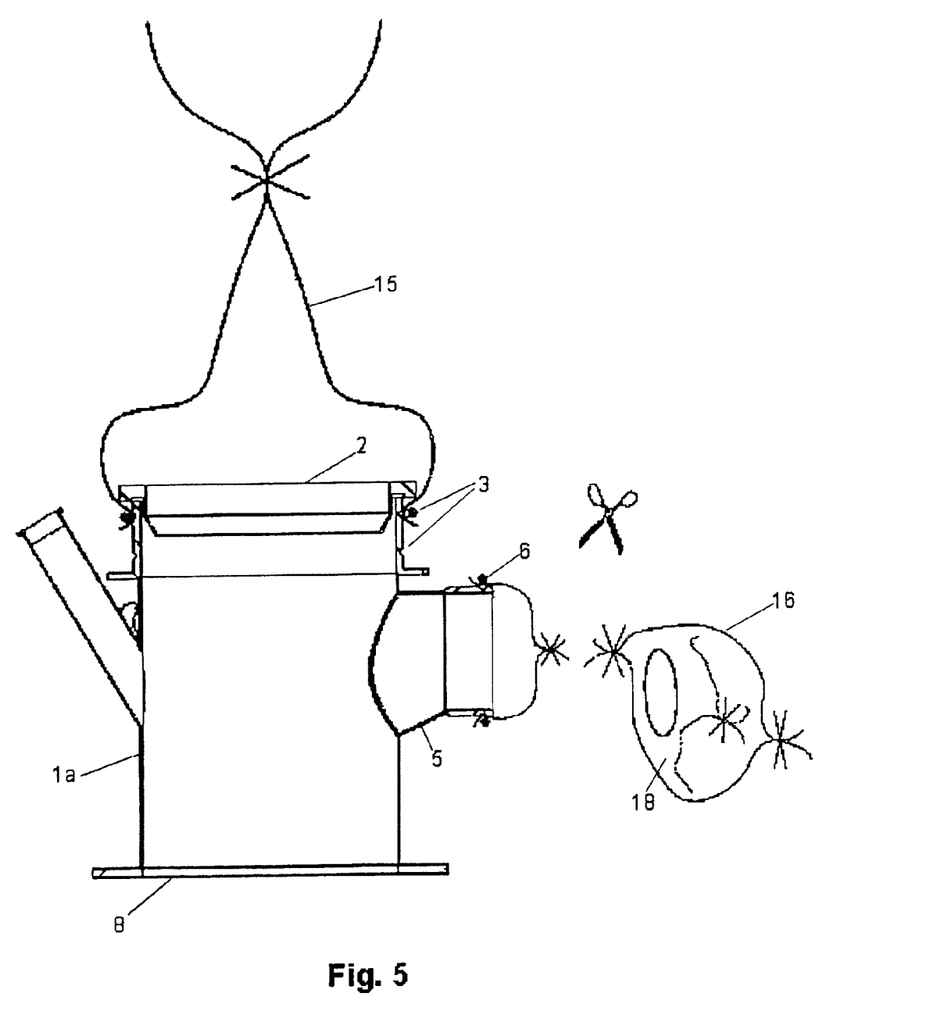
FIG. 5 shows a fourth step of a method using the liner emptying device of FIG. 1.
Figure 6:
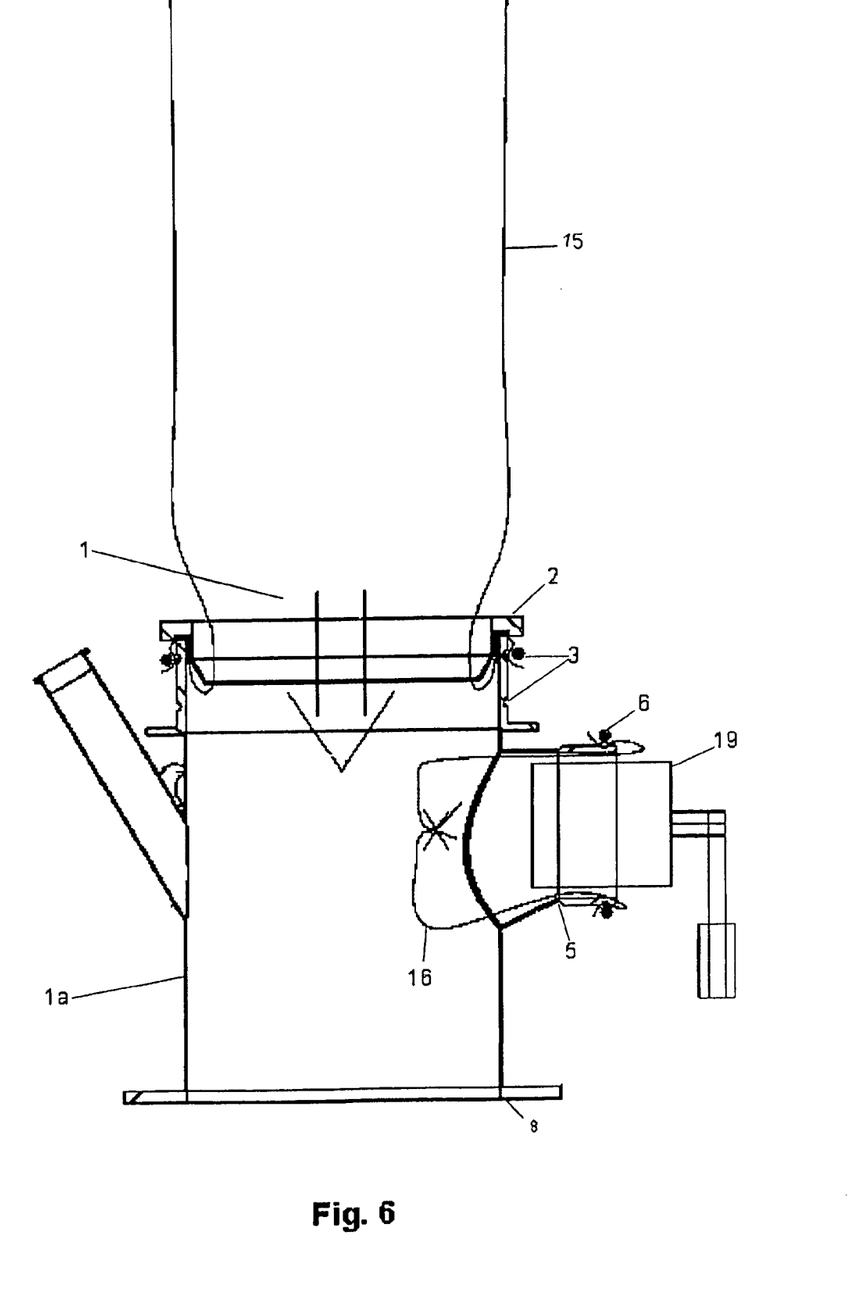
FIG. 6 shows a fifth step of a method using the liner emptying device of FIG. 1.
Figure 7:
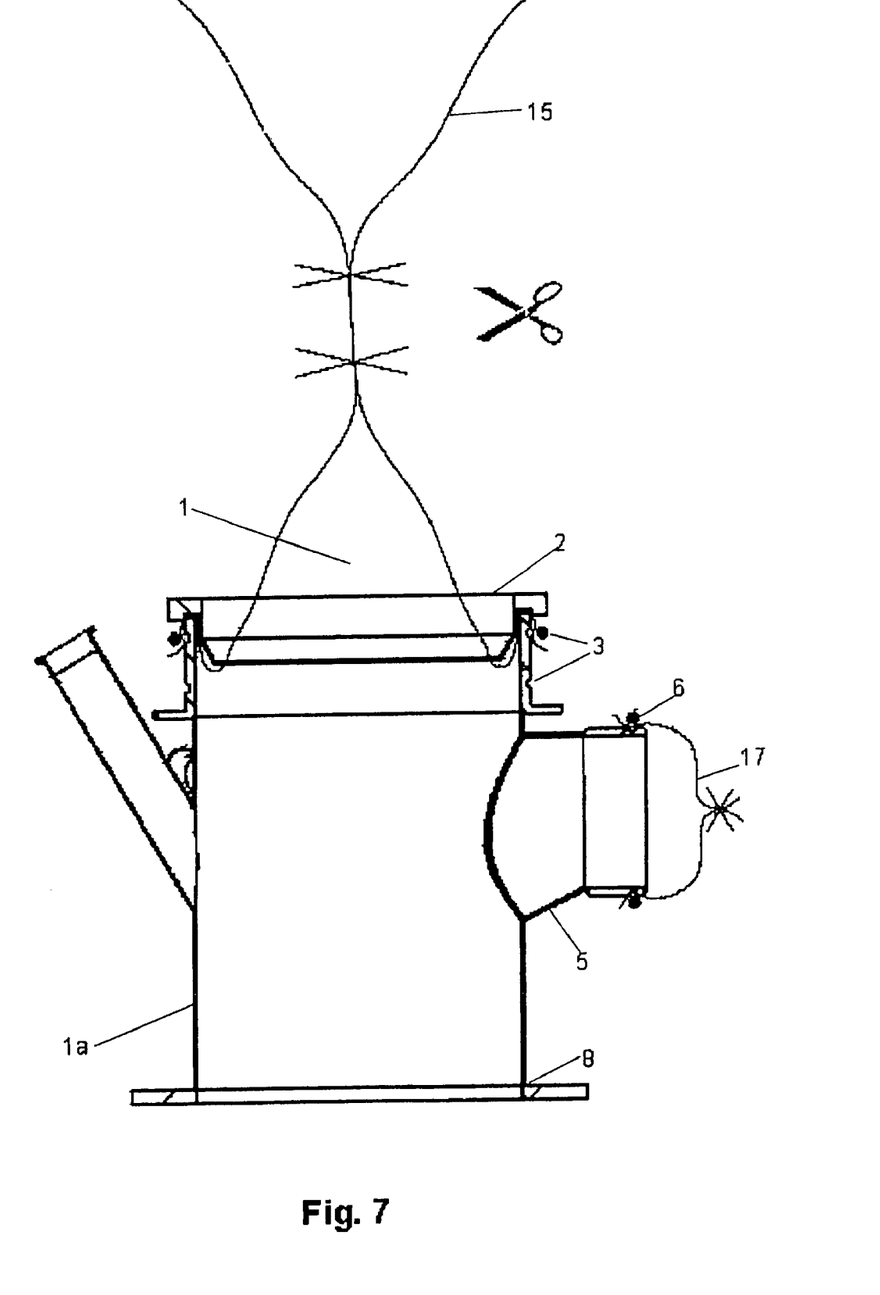
FIG. 7 shows a sixth step of a method using the liner emptying device of FIG. 1.

The tied-off removed film 18 can be drawn through the lateral access port 5 into the film bag 16 and again separated from the liner emptying device by tying it off twice and cutting it between the tied-off points of the film bag (FIG. 5). After the O-ring fastening the liner has been pushed onto the outer of the two grooves 3, the sealing flange 2 can be lowered with the hand lever so that the liner is sealingly connected to the liner emptying device. For the following emptying process, as shown in FIG. 6, the lateral access port can be closed with a cap 19. The closure closing the liner 15 is opened for emptying. As the last step after emptying, as shown in FIG. 7, the liner 15 is tied off twice and cut between the tied-off points so that the initial position of FIG. 2 prior to joining a new liner 15 is reached again.

Figure 8:
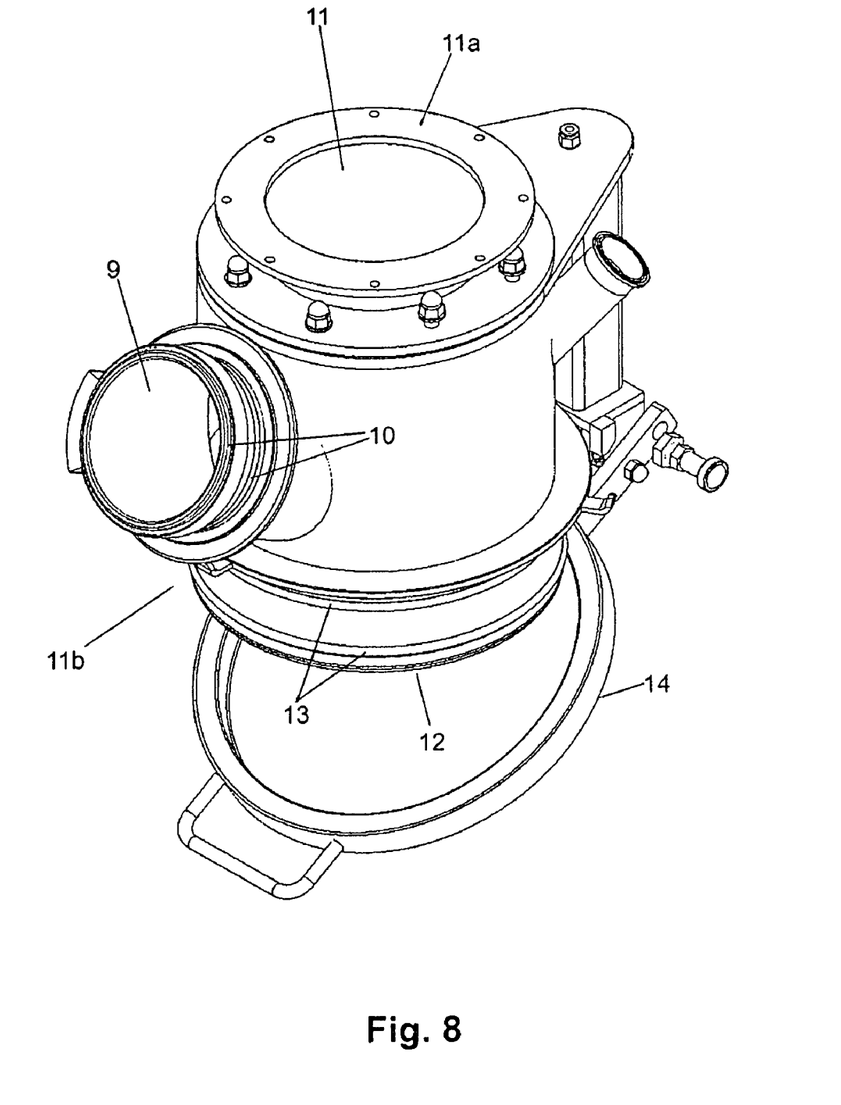
FIG. 8 is a perspective view of a liner filling device according to the present invention.

A preferred embodiment of a liner filling device is explained hereinafter. The liner filling device is the inverse case to the liner emptying device described above, i.e., a device for contamination-free filling of a liner which is not hazardous to health. FIG. 8 shows a liner filling device according to a preferred embodiment of the invention where the liner filling device comprises a connection device 11a for integration into a process at an opening 11 in a preferably cylindrical base body 11b that forms a chamber, a lateral access port 9 having two grooves 10 for connection to a film bag or film package, two grooves 13 for fastening the liner to the outlet 12 of the filling device and a static face ring 14 with a seal.

Figure 9:
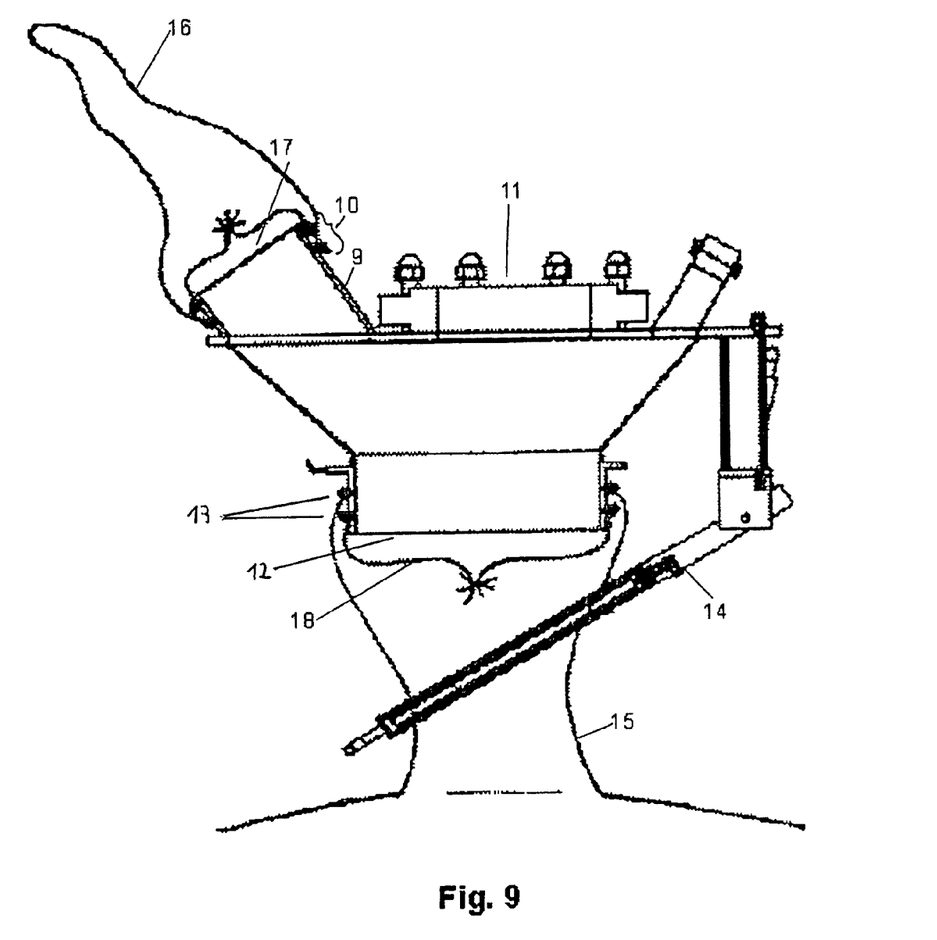
FIG. 9 shows a first step of a method using the liner filling device of FIG. 8.
Figure 10:
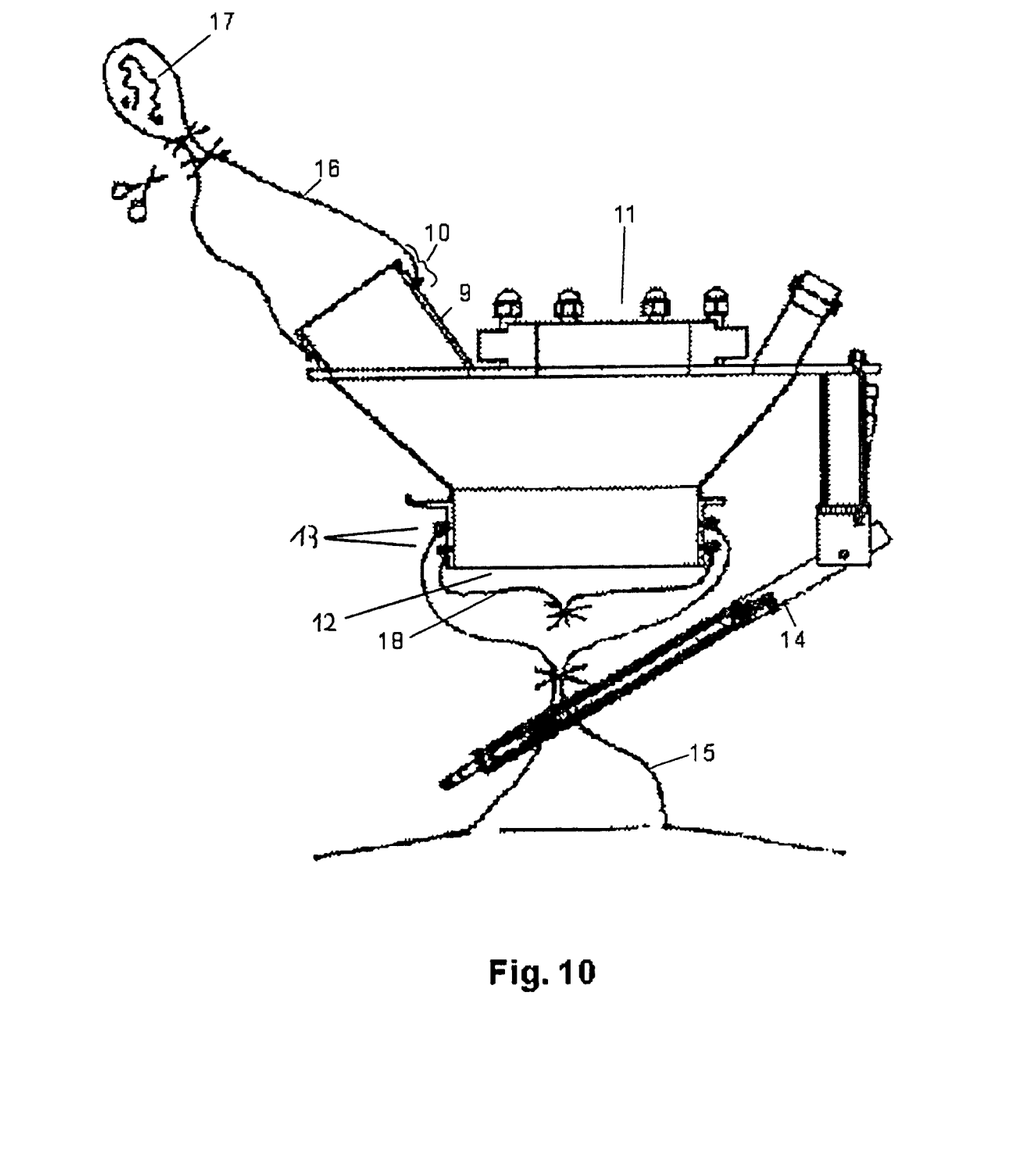
FIG. 10 shows a second step of a method using the liner filling device of FIG. 8.

In the initial position as shown in FIG. 9, the lateral access port 9 and the outlet 12 into the liner are closed with a tied-off film. A film bag 16 is fastened at the inner groove of the two grooves 10, via which the tied-off film 17 closing the lateral inlet can be removed by tying it off twice and separating it between the tied-off points. The liner 15 is fastened through the static face ring 14 on the inner groove of the two grooves 13. The liner 15 can be tied off, as shown in FIG. 10.

Figure 11:
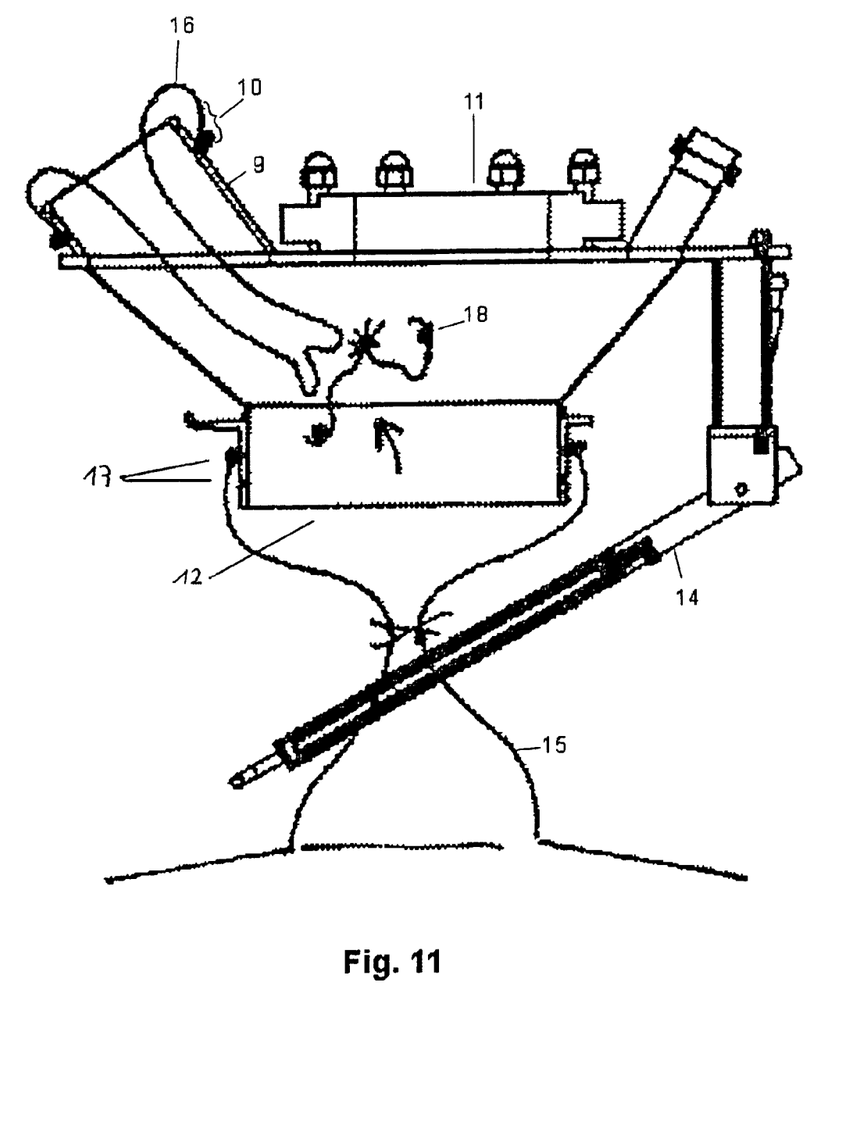
FIG. 11 shows a third step of a method using the liner filling device of FIG. 8.
Figure 12:
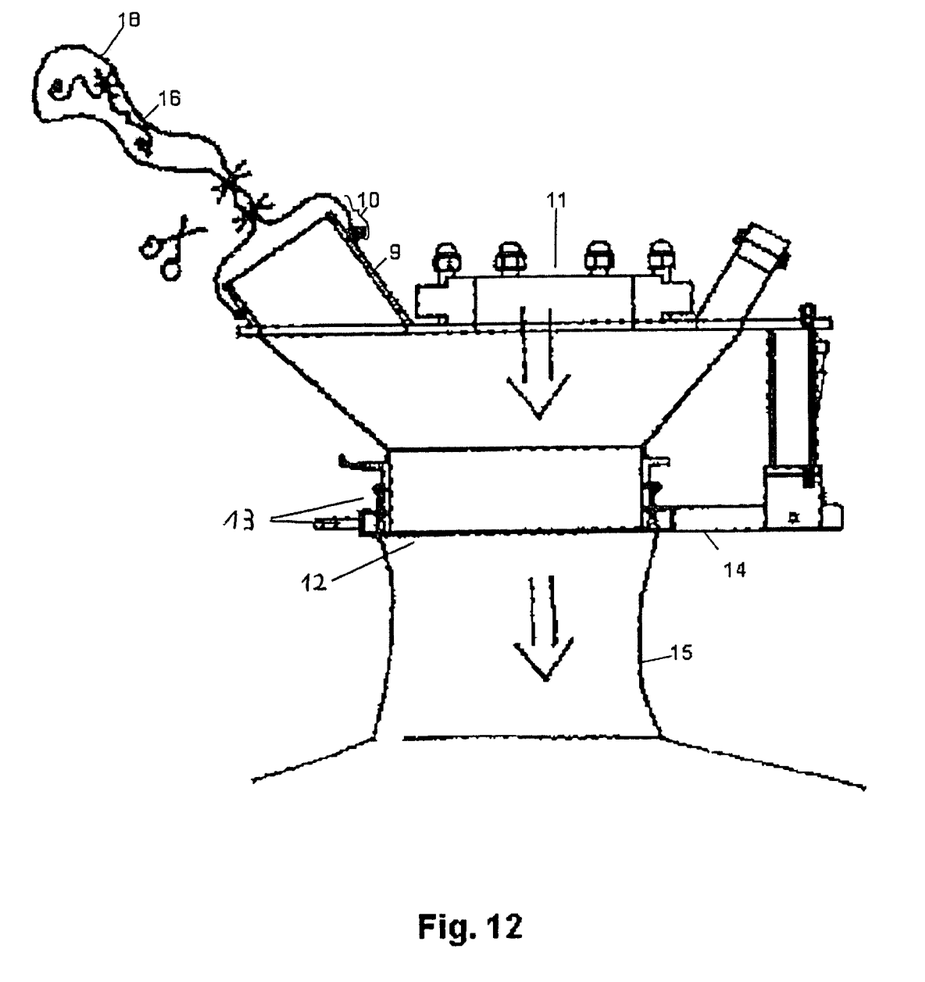
FIG. 12 shows a fourth step of a method using the liner filling device of FIG. 8.
Figure 13:
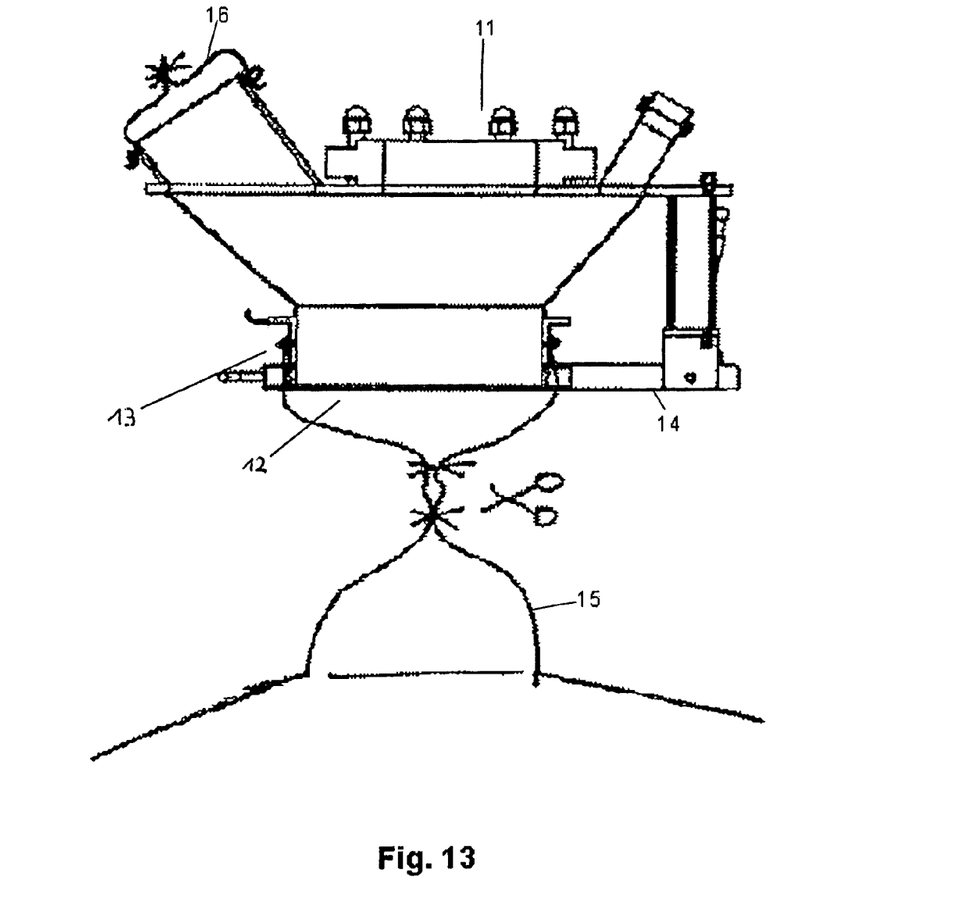
FIG. 13 shows a fifth step of a method using the liner filling device of FIG. 8.
Figure 14:
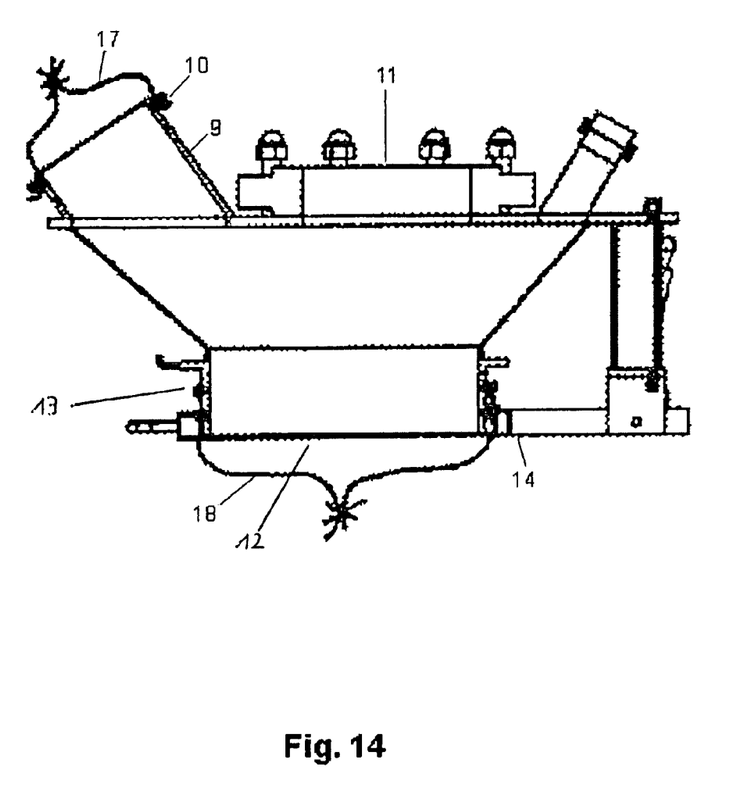
FIG. 14 shows a sixth step of a method using the liner filling device of FIG. 8.

After removing the film 18 which closes the filling opening and forms the remainder of the previously filled liner, through the lateral access port 9 (FIG. 11), the O-ring fastening the liner 15 can be pushed onto the outer groove of the two grooves 13, the liner 15 opened and the film 18 removed from the filling device by twice tying off the film bag 16 and cutting between the tied-off points of the film bag 16. The connected liner 15 can now be filled (FIG. 12). When the liner 15 is filled with the predetermined quantity, as shown in FIG. 13, the liner 15 is tied off twice and separated between the tied-off points, whereby the liner filling device returns to its initial state as shown in FIG. 14.

In both methods and devices, a continuous tubular film can be provided at the lateral access port into which the remainder of the filled/emptied liner can be drawn and taken out. In this case, the film bag and the grooves are not necessary and a suitable fastening device is provided for the continuous tubular film package.

What is claimed is:

1. A method of emptying containers having liners using a liner emptying device, which comprises:
   a base body having an opening and forming a chamber into which a container having a liner is emptied,
   a first fastening device for fastening the liner to the opening,
   a sealing flange for sealing the liner to the opening,
   a lever for raising and placing the sealing flange away from or onto the opening,
   an access port for providing access into the base body with a second fastening device for fastening a film bag or a continuous tubular film on the access port, and
   a connecting device for connection of the liner emptying device to a component of a treatment process,
   comprising the steps of:
   a) attaching a closed liner of a container to be emptied through the sealing flange to the first fastening device, at which a closed remainder of a liner of a previously emptied container is also attached,
   b) fastening a film bag to said access port, at which a film closing the access port is also attached, or a continuous tubular film to said access port,
   c) removing the closed remainder of the liner of the previously emptied container at the opening through the access port,
   d) placing the sealing flange so as to seal the liner to the opening,
   e) emptying the connected container into the liner emptying device,
   f) tying off the liner at two adjacent locations and cutting the liner between the two adjacent locations.

2. The method according to claim 1, comprising further the step of:
   subsequent to step b), removing the film closing the access port by twice tying off the film bag at two adjacent locations and then cutting the film bag between the tied-off locations.

3. The method according to claim 2, wherein the first fastening device for fastening the liner to the opening comprises an inner and an outer groove, further comprising the steps of:
   in step a), fastening the liner in the inner groove with an O-ring and, after step c), pushing the O ring fastening the liner onto the outer groove.

4. The method according to one of the claims 2, further comprising the step of:
   in step e), closing the access port with a cap.

5. The method according to one of the claims 2, wherein the second fastening device for fastening the film bag comprises an inner and an outer groove, further comprising the steps of:
   in step b), fastening the film bag in the inner groove of the second fastening device with an O-ring and, between step b) and c), pushing the O ring fastening the film bag onto the outer groove of the second fastening device.

6. The method according to claim 1, comprising further the step of:
   in step c), drawing the closed remainder through the access port into the film bag or the continuous tubular film and separating the closed remainder by tying off the film bag or the continuous tubular film at two adjacent locations and cutting the film bag or the continuous tubular film between the two adjacent locations.

7. The method according to claim 6, comprising further the step of:
   subsequent to step b), removing the film closing the access port by twice tying off the film bag at two adjacent locations and then cutting the film bag between the tied-off locations.

8. The method according to claim 6, wherein the first fastening device for fastening the liner to the opening comprises an inner and an outer groove, further comprising the steps of:
   in step a), fastening the liner in the inner groove with an O-ring and, after step c), pushing the O ring fastening the liner onto the outer groove.

9. The method according to one of the claims 6, further comprising the step of:
   in step e), closing the access port with a cap.

10. The method according to one of the claims 6, wherein the second fastening device for fastening the film bag comprises an inner and an outer groove, further comprising the steps of:
    in step b), fastening the film bag in the inner groove of the second fastening device with an O-ring and, between step b) and c), pushing the O ring fastening the film bag onto the outer groove of the second fastening device.

11. The method according to claim 1, wherein the first fastening device for fastening the liner to the opening comprises an inner and an outer groove, further comprising the steps of:
    in step a), fastening the liner in the inner groove with an O-ring and, after step c), pushing the O ring fastening the liner onto the outer groove.

12. The method according to one of the claims 11, further comprising the step of:
    in step e), closing the access port with a cap.

13. The method according to one of the claims 11, wherein the second fastening device for fastening the film bag comprises an inner and an outer groove, further comprising the steps of:
    in step b), fastening the film bag in the inner groove of the second fastening device with an O-ring and, between step b) and c), pushing the O ring fastening the film bag onto the outer groove of the second fastening device.

14. The method according to one of the claims 1, further comprising the step of:
   in step e), closing the access port with a cap.

15. The method according to one of the claims 14, wherein the second fastening device for fastening the film bag comprises an inner and an outer groove, further comprising the steps of:
   in step b), fastening the film bag in the inner groove of the second fastening device with an O-ring and, between step b) and c), pushing the O ring fastening the film bag onto the outer groove of the second fastening device.

16. The method according to one of the claims 1, wherein the second fastening device for fastening the film bag comprises an inner and an outer groove, further comprising the steps of:
   in step b), fastening the film bag in the inner groove of the second fastening device with an O-ring and, between step b) and c), pushing the O ring fastening the film bag onto the outer groove of the second fastening device.

* * * * *